United States Patent
Paelicke et al.

(10) Patent No.: US 8,769,819 B2
(45) Date of Patent: Jul. 8, 2014

(54) METHODS OF FABRICATING COMBINATION GEAR FOR STACKED PLANETARY GEARSET

(75) Inventors: Gary H. Paelicke, Saline, MI (US); Leonid Basin, Farmington Hills, MI (US); Avinash Singh, Sterling Heights, MI (US)

(73) Assignee: GM Global Technology Operations, LLC., Detroit, MI (US)

( * ) Notice: Subject to any disclaimer, the term of this patent is extended or adjusted under 35 U.S.C. 154(b) by 315 days.

(21) Appl. No.: 13/273,835

(22) Filed: Oct. 14, 2011

(65) Prior Publication Data

US 2013/0091708 A1 Apr. 18, 2013

(51) Int. Cl.
*B23P 15/14* (2006.01)

(52) U.S. Cl.
USPC ........... 29/893.2; 29/893; 29/893.1; 475/277; 475/282; 475/903

(58) Field of Classification Search
CPC ........................................................ F16H 1/46
USPC .............. 29/893, 893.1, 893.2; 475/277, 282, 475/903
See application file for complete search history.

(56) References Cited

U.S. PATENT DOCUMENTS

| | | | |
|---|---|---|---|
| 2,478,868 A | 8/1949 | Hasbany | |
| 2,478,869 A | 8/1949 | Hasbany | |
| 3,008,355 A * | 11/1961 | Grudin | 475/334 |
| 4,164,155 A | 8/1979 | Reed et al. | |
| 4,224,838 A | 9/1980 | Roushdy et al. | |
| 4,229,996 A | 10/1980 | Hildebrand | |
| 4,825,723 A * | 5/1989 | Martin | 475/332 |
| 5,429,557 A | 7/1995 | Beim | |
| 5,503,605 A | 4/1996 | Beim | |
| 5,718,300 A | 2/1998 | Frost | |
| 7,404,782 B2 | 7/2008 | Kudoh et al. | |
| 7,803,082 B2 | 9/2010 | Diosi et al. | |
| 7,824,302 B2 | 11/2010 | Diosi et al. | |
| 8,206,258 B2 * | 6/2012 | Ziemer | 475/331 |
| 8,357,071 B2 * | 1/2013 | Hino | 475/344 |
| 8,434,564 B2 * | 5/2013 | Tomayko et al. | 173/47 |
| 8,622,869 B2 * | 1/2014 | Mourani | 475/332 |
| 8,628,447 B2 * | 1/2014 | Schmitz et al. | 475/302 |
| 2009/0305837 A1 | 12/2009 | Hiraiwa | |
| 2010/0041509 A1 | 2/2010 | Gumpoltsberger et al. | |
| 2010/0044141 A1 | 2/2010 | Kimes et al. | |
| 2010/0190601 A1 | 7/2010 | Phillips | |
| 2010/0210399 A1 | 8/2010 | Wittkopp et al. | |
| 2010/0311537 A1 | 12/2010 | Ziemer | |
| 2011/0009229 A1 | 1/2011 | Bauknecht et al. | |

FOREIGN PATENT DOCUMENTS

WO WO2005120877 A1 12/2005
WO WO2009106408 A1 9/2009

(Continued)

*Primary Examiner* — Richard Chang

(57) ABSTRACT

Three methods of fabricating an intermediate, center or combination gear for a stacked planetary gear assembly are presented. A first method comprehends forming male splines on the outer surface of the inner (ring) gear and female splines on the inner surface of the outer (sun) gear. The gears are then heat treated and assembled. A second method comprehends broaching internal splines in the outer (sun) gear as well as end milling, broaching or polygon turning face splines on one end of the outer gear and an opposing, adjacent end of the inner (ring) gear. A third method includes fabricating and heat treating the inner and outer gears. A small area of the hardened case is then removed by, for example, machining. The gears are mated, heated rapidly by a pulse of electric current and upset in the heated region.

16 Claims, 3 Drawing Sheets

(56) References Cited

FOREIGN PATENT DOCUMENTS

| WO | WO2009106409 | A1 | 9/2009 |
| WO | WO2010081819 | A1 | 7/2010 |
| WO | WO2010081820 | A1 | 7/2010 |
| WO | WO2010139553 | A1 | 12/2010 |
| WO | WO2010139554 | A1 | 12/2010 |
| WO | WO2010139559 | A1 | 12/2010 |

* cited by examiner

METHODS OF FABRICATING COMBINATION GEAR FOR STACKED PLANETARY GEARSET

FIELD

The present disclosure relates to stacked planetary gearsets and more particularly to methods of fabricating a component of a stacked planetary gearset.

BACKGROUND

The statements in this section merely provide background information related to the present disclosure and may or may not constitute prior art.

Modern motor vehicle automatic transmissions typically utilize a plurality of planetary gear assemblies disposed in tandem and a plurality of clutches and brakes that act upon elements of the planetary gear assemblies in accordance with a control scheme to provide a sequence of forward gears or speed ratios and reverse.

In certain applications, it is desirable that two planetary gear assemblies be arranged concentrically, or nearly so, in an axial plane. Such a configuration is referred to as "stacked." A stacked planetary gear assembly provides significant gear ratio flexibility in a very compact package. Such a stacked planetary gear assembly typically requires a center or intermediate component which is a combination of the ring (outer) gear of the inner planetary gear assembly and the sun (inner) gear of the outer planetary gear assembly.

Unfortunately, difficulties attendant the manufacture of the intermediate component or combination gear have limited the availability and thus the use of stacked planetary gear assemblies. For example, the combination gear, which preferably has a thin section, typically necessitates the forming of a precision helical gear on both the inside and the outside of the component. Additionally, the component must also undergo heat treatment and the dimensional and geometry changes brought about by such heat treatment must be both minimal and minimized if the component is to meet functional requirements.

SUMMARY

The present invention provides improved methods of fabricating an intermediate, center or combination gear for a stacked planetary gear assembly. A first method for fabricating a splined assembly in which the gears are in the same axial plane comprehends forming male splines on the outer surface of the inner (ring) gear and female splines on the inner surface of the outer (sun) gear. The gears are then separately heat treated and assembled in the planet gear carriers. A second method utilizes face splines or projections to couple gears that are in distinct axial planes (are axially offset) and comprehends broaching internal splines in the outer (sun) gear as well as end milling, broaching or polygon turning face splines on one end of the outer gear and an opposing, adjacent end of the inner (ring) gear. The gears are then heat treated and assembled, preferably with a light press fit. A third method provides an axially offset combination gear. The inner and outer gears are fabricated and heat treated. After heat treating, a small area of the hardened case is removed by, for example, machining. The gears are then mated, heated rapidly by a pulse of electric current and upset in the heated region. Alternatively, the gears may be secured together by brazing.

Thus it is an aspect of the present invention to provide various methods of fabricating and assembling a combination gear for a stacked planetary gear assembly.

It is a further aspect of the present invention to provide a method of fabricating a combination gear including forming splines on the outer surface of the inner gear and the inner surface of the outer gear, heat treating the gears and assembling them in the planet gear carriers.

It is a still further aspect of the present invention to provide a method of fabricating a combination gear including broaching internal splines in the outer gear as well as end milling, broaching or polygon turning face splines on one end of the outer gear and an opposing, adjacent end of the inner gear.

It is a still further aspect of the present invention to provide a method of fabricating a combination gear including forming inner and outer gears, heat treating them, removing a small area of the hardened case, mating the gears, heating them rapidly by a pulse of electric current and upsetting them in the heated region.

It is a still further aspect of the present invention to provide a method of fabricating a combination gear including forming inner and outer gears, heat treating them, removing a small area of the hardened case, mating the gears and brazing them together.

Further aspects, advantages and areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
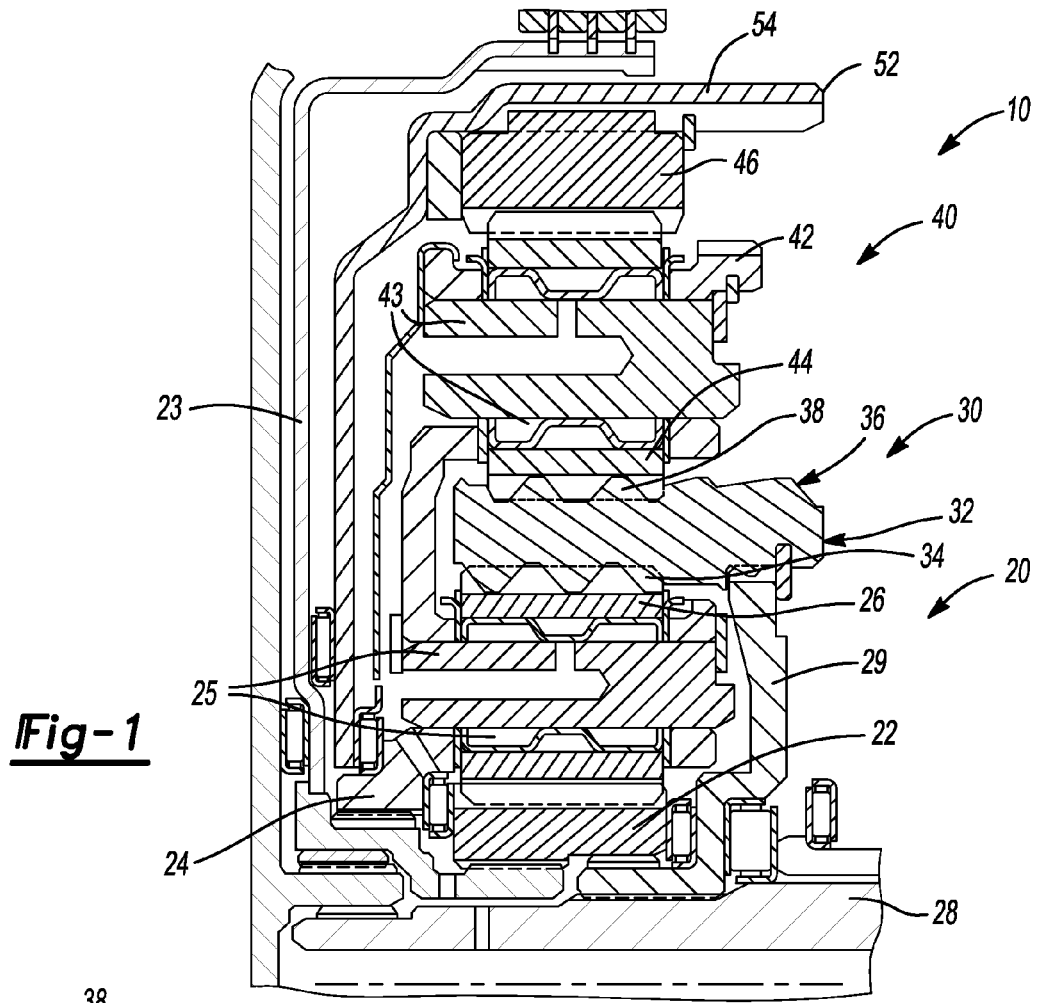
FIG. 1 is a full sectional view of a stacked planetary gear assembly incorporating a combination sun and ring gear.

With reference to FIG. 1, a typical and exemplary stacked, offset planetary gear assembly is illustrated and generally designated by the reference number 10. The stacked, offset planetary gear assembly 10 includes a first or inner planetary gear assembly 20 having a first sun gear 22 that may be coupled to and driven by a quill, hub or other member 23 and a first planet gear carrier 24 which includes shafts and anti-friction bearings 25 that rotatably support a plurality of (three or more) first planet gears or pinions 26 (one of which is illustrated in FIG. 1). A shaft, quill or other member 28 is coupled to a hub or drive member 29 which, in turn, is coupled to a combination gear 30 having an inner or first ring gear 32 having teeth 34 and an outer or second sun gear 36 having teeth 38. The first plurality of planet gears or pinions 26 are in constant mesh with both the first sun gear 22 and the teeth 34 of the first ring gear 32.

The stacked planetary gear assembly 10 also includes a second or outer planetary gear assembly 40 including the second sun gear 36 and its teeth 38, a second planet gear carrier 42 includes shafts and anti-friction bearings 43 that rotatably support a second plurality of (three or more) planet gears or pinions 44 (one of which is illustrated in FIG. 1) and a second ring gear 46. The second plurality of planet gears or pinions 44 are in constant mesh with both the second sun gear 36 and its teeth 38 and the second ring gear 46. The second ring gear 46 is piloted on and coupled to a hub or similar member 52 by an interengaging spline set 54. The second ring gear 46 may drive or be driven by other components (not illustrated) or it may be stationary and grounded to a housing (also not illustrated).

Figures 2A, 2B:
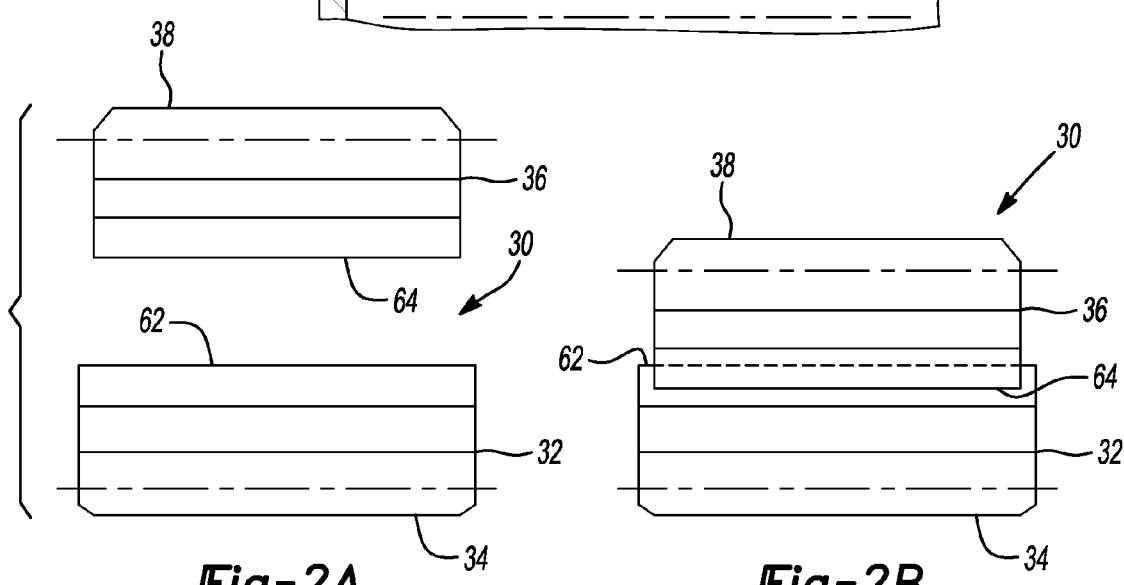
FIG. 2A is a diagrammatic, side elevational view of the component gear parts utilized to fabricate a combination gear according to a first method in pre-assembly configuration.
FIG. 2B is a diagrammatic, side elevational view of a combination gear fabricated according to a first method.

Referring now to FIGS. 2A and 2B, the combination gear 30 comprising the first ring gear 32 and the second sun gear 36 fabricated by a first method is illustrated in FIG. 2A in pre-assembly configuration. This first method provides a combination gear 30 in which the first ring gear 32 and the second sun gear 36 reside in the same or substantially the same axial plane. The first ring gear 32 has, on its outer surface, male splines 62 which mate closely with female splines 64 on the inner surface of the second sun gear 36. Conventional gear hobbing and broaching processes are utilized to machine the splines 62 and 64 and the splines 62 and 64 may be sized for either a slip fit or a light interference fit. Then, the gears 32 and 36 are separately heat treated by hardening and tempering with the heat treating processes optimized to produce minimal distortion and dimensional change of both of the first ring gear 32 and the second sun gear 36. The gears 32 and 36 are then mated and finish assembled as illustrated in FIG. 2B with their planetary carrier. It will be appreciated that with the full (axial) length of the splines 62 and 64, the first method is best suited to the fabrication of a combination gear 30 in which the of the first ring gear 32 and the second sun gear 36 lie in the same or substantially the same axial plane, that is, share the same axial position.

Figure 3A:
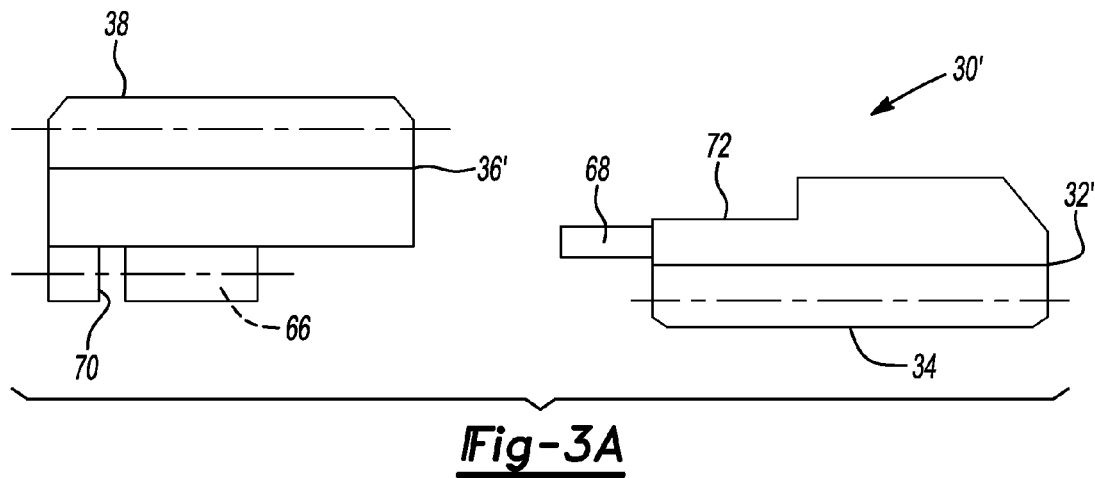
FIG. 3A is a diagrammatic, side elevational view of the component gear parts utilized to fabricate a combination gear according to a second method in pre-assembly configuration.
Figure 3B:
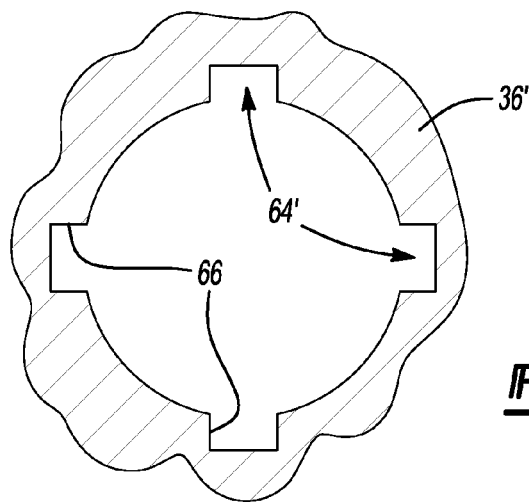
FIG. 3B is a diagrammatic, end elevational view of a sun gear fabricated according to a second method.
Figure 3C:
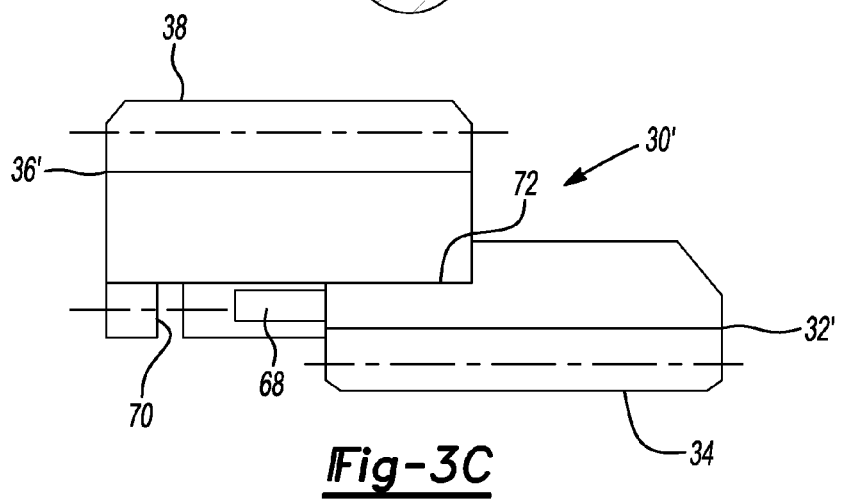
FIG. 3C is a diagrammatic, side elevational view of a combination gear fabricated according to a second method.

Referring now to FIGS. 3A, 3B and 3C, a second method of the present invention provides a combination gear 30' in which a first ring gear 32' is axially offset from a second sun gear 36'. This configuration allows exchanging radial space for axial offset, that is, the gears 32' and 36' may be more compact in the radial direction relative to the configuration in FIGS. 2A and 2B, which may better satisfy certain design requirements.

In FIG. 3A, the first ring gear 32' and the second sun gear 36' are shown in pre-assembly configuration. As illustrated in FIG. 3B, the second sun gear 36' has a plurality, for example, four, six, eight or more, broached female splines, slots or channels 64' incorporating larger, square sided teeth 66 into which a like plurality of specially produced face geometry male splines or projections 68 are mated. The face geometry splines 68 can be produced by end milling, broaching or polygon turning. The second sun gear 36' also includes an inner circumferential channel or groove 70 which receives the snap ring 50 which retains the connecting member 48. The first ring gear 32' also includes an outer notch or shoulder 72 which engages and locates the second sun gear 36' on the first ring gear 32'. Before assembly, the first ring gear 32' and the second sun gear 36' are heat treated, that is, hardened and tempered as noted above. The second sun gear 36' assembles onto the first ring gear 32' as illustrated in FIG. 3C with a light press fit and is thereafter retained in this configuration by installation into a stacked planetary gear assembly such as the assembly 10.

In either the method of FIGS. 2A and 2B or FIGS. 3A, 3B and 3C, physical retaining means may be utilized to maintain the required relative position of the two gears, in response to axial separating forces, when required to satisfy design requirements. Such means may include spring steel retaining rings, formed upsets of the mating gear teeth or physical steps as required by the design.

Figure 4A:
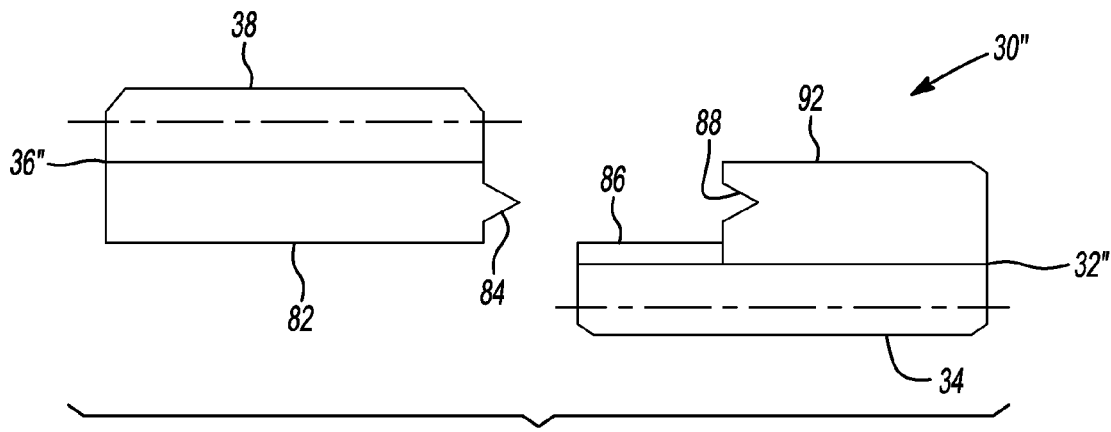
FIG. 4A is a diagrammatic, side elevational view of the component gear parts utilized to fabricate a combination gear according to a third method in pre-assembly configuration.
Figure 4B:
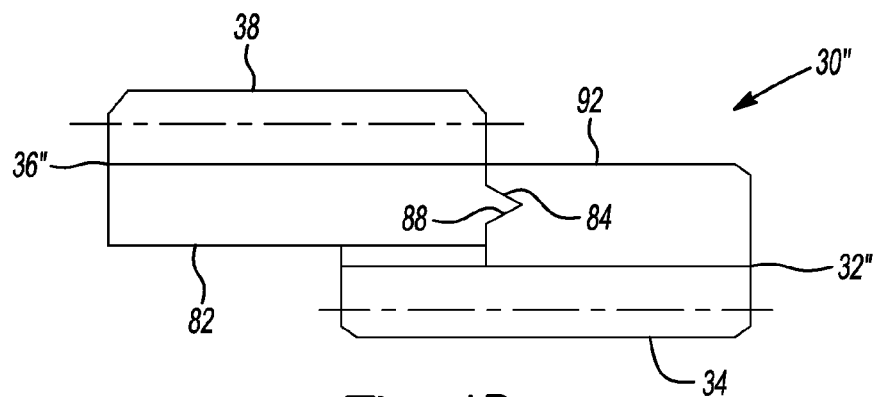
FIG. 4B is a diagrammatic, side elevational view of a combination gear fabricated according to a third method.

Referring now to FIGS. 4A and 4B, a third method of the present invention provides a combination gear 30" in which a first ring gear 32" is axially offset from a second sun gear 36" and the gears 32" and 36" are assembled by electrical resistance heating and welding or brazing. As illustrated in FIG. 4A, the second sun gear 36" includes a smooth inner surface 82 and an annular projection 84 at one end having a preferably triangular cross section. The first ring gear 32" includes a complementary shoulder or reduced diameter portion 86 and complementary annular recess 88 having a nominal diameter identical to that of the projection 84. The first ring gear 32" also includes a smooth outer surface 92.

After fabrication, the gears 32" and 36" are separately heat treated by hardening and tempering with the heat treating processes optimized to produce minimal distortion and dimensional change. Then, by lathe turning or a similar process, small portions of the hardened case adjacent the annular projection 84 and the annular recess 88 are removed.

As illustrated in FIG. 4B, the second sun gear 36" is disposed in offset relationship, in the reduced diameter portion 86 of the first ring gear 32" and both gears 32" and 36" are placed in an electrical capacitive discharge (CD) machine. A brief but powerful electrical current is passed through the gears 32" and 36" axially which heats, melts and upsets the annular projection 84 and autogenously bonds (welds) it to the annular recess 88, thereby attaching the gears 32" and 36" to one another.

Figure 4C:
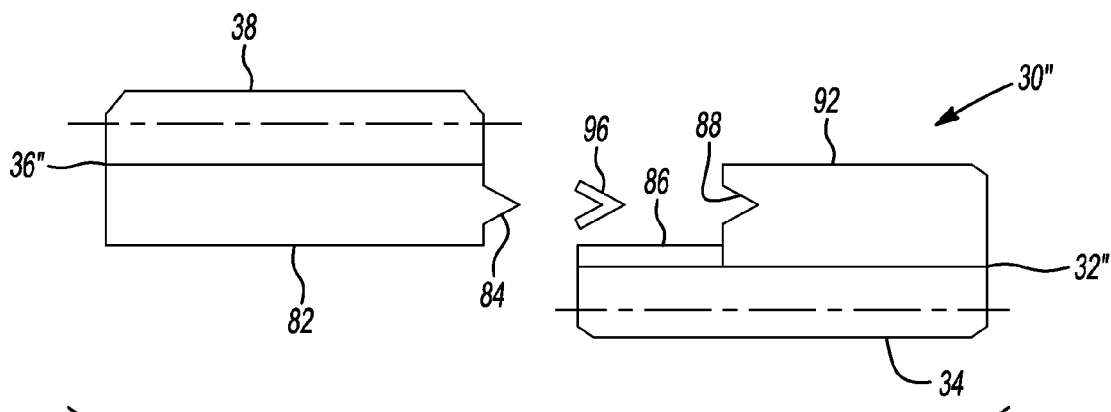
FIG. 4C is a diagrammatic, side elevational view of the component gear parts utilized to fabricate a combination gear by brazing according to a third method.

As illustrated in FIG. 4C, the gears 32" and 36" may alternatively be connected together by brazing. In this process, a complementarily configured annulus 96 of, for example a copper alloy or similar material, is disposed between the annular projection 84 of the second sun gear 36" and the recess 88 of the first ring gear 32". Again, a brief but powerful electrical current is passed through the gears 32" and 36" axially which heats and melts the alloy annulus 96 and brazes (bonds) the annular projection 84 to the annular recess 88, thereby attaching the gears 32" and 36" to one another.

The description of the invention is merely exemplary in nature and variations that do not depart from the gist of the invention are intended to be within the scope of the invention. Such variations are not to be regarded as a departure from the spirit and scope of the invention.

What is claimed is:

1. A method of fabricating a combination gear for a stacked planetary gear assembly comprising the steps of:
    forming a first, ring gear having gear teeth on an inner surface,
    forming a second, sun gear having gear teeth on an outer surface, forming a plurality of axial projections on an end of said first, ring gear and a shoulder on an outer surface of said first, ring gear, forming a plurality of axial channels on an inner surface of said second, sun gear, and assembling said second, sun gear on said first, ring gear by engaging said projections and channels and axially offsetting said gears.

2. The method of claim 1 wherein said plurality of axial projections includes at least two projections.

3. The method of claim 1 further including the step of providing a stacked planetary gear assembly and disposing said assembled sun gear and ring gear in said planetary gear assembly.

4. The method of claim 1 further including the step of heat treating said ring gear and said sun gear.

5. The method of claim 4 wherein said heat treating step includes hardening and tempering.

6. The method of claim 1 wherein said projections are face spline teeth.

7. A method of fabricating a combination gear for a stacked planetary gear assembly comprising the steps of:

forming a first, ring gear having gear teeth on an inner surface, forming a second, sun gear having gear teeth on an outer surface, forming an annular projection on an end of said first, ring gear, forming an annular channel on an end of said second, sun gear, assembling said second, sun gear on said first, ring gear by engaging said projection and said recess, and electrically heating said projection and channel and bonding said first, ring gear to said second, sun gear.

8. The method of claim 7 further including the step of heat treating said ring gear and said sun gear.

9. The method of claim 8 wherein said heat treating step includes hardening and tempering.

10. The method of claim 8 further including the step of removing a portion of a hardened case adjacent said projection and said recess.

11. The method of claim 7 further including the step of providing an alloy metal ring and disposing said ring between said annular projection and said annular recess.

12. A method of fabricating a combination gear for a stacked planetary gear assembly comprising the steps of:

forming a first, ring gear having gear teeth on an inner surface, forming a shoulder adjacent an outer surface of said first, ring gear, forming at least one first mating feature on said first, ring gear, forming a second, sun gear having gear teeth on an outer surface and an end surface, forming at least one second mating feature complementary to said first mating feature on said second, sun gear, and assembling said second, sun gear on said first, ring gear by engaging said first and second mating features and abutting said end surface of said sun gear with said shoulder of said ring gear to axially offset said gears.

13. The method of claim 12 wherein said first mating feature is a plurality of projections formed on an end of said ring gear and said second mating feature is a plurality of channels formed on an inner surface of said sun gear.

14. The method of claim 13 wherein said plurality of projections includes at least two axial projections.

15. The method of claim 12 wherein said first mating feature is an annular channel formed in said shoulder of said ring gear and said second mating feature is an annular projection formed on said end surface of said sun gear.

16. The method of claim 15 further including the step of electrically heating said annular channel and said annular projection and bonding said ring gear to said sun gear.

\* \* \* \* \*